April 19, 1938. R. E. GILLMOR Re. 20,701

BALL GYRO HORIZON

Original Filed Dec. 18, 1931 2 Sheets-Sheet 1

INVENTOR
Reginald E Gillmor
BY
Herbert H. Thompson
HIS ATTORNEY.

April 19, 1938. R. E. GILLMOR Re. 20,701

BALL GYRO HORIZON

Original Filed Dec. 18, 1931 2 Sheets-Sheet 2

INVENTOR
Reginald E Gillmor
BY
Herbert H. Thompson
HIS ATTORNEY.

Reissued Apr. 19, 1938

Re. 20,701

UNITED STATES PATENT OFFICE 20,701

BALL GYRO HORIZON

Reginald E. Gillmor, Great Neck, N. Y., assignor to Sperry Gyroscope Company, Inc., Brooklyn, N. Y., a corporation of New York Original No. 1,988,591, dated January 22, 1935, Serial No. 581,936, December 18, 1931. Application for reissue October 29, 1936, Serial No. 108,223

23 Claims. (Cl. 33—204)

The invention described in this specification is an artificial horizon or gyro vertical of a type suitable for use in airplanes as a means of indicating the attitude of the airplane to the true horizon with respect to both horizontal axes.

It is now well known that the gyroscope provides the only feasible method for continuously giving an indication of the true horizon on an airplane when the ground is obscured. Various forms of pendulums have been proposed for this purpose but all of them are rendered impractical by reason of the fact that, under the influence of the acceleration and centrifugal forces to which the airplane is subjected, all forms of pendulums except those which are gyroscopic take up a position which is the resultant between the acceleration of gravity and the acceleration of the plane by reason of change of speed or change of direction.

The gyroscope solves this problem by the introduction of an indirect or loose gravitational control; that is to say, the gyroscope provides a practicable means for obtaining a very long period of oscillation which responds very slowly to disturbing forces and, as these disturbing forces are constantly being reversed, the gyroscope deviates only slightly from the true vertical and is directly restored without oscillation by a source of power.

In using the gyroscope as a means of indicating the horizontal on an airplane, three fundamental problems are involved. These are (1) to convert the gyroscope from a spiral oscillating gyro-pendulum into a straight indicating aperiodic device of long period, (2) to arrange the gyroscopic system in a manner which will provide the pilot with a direct indication of the lateral and longitudinal attitude of his plane to the horizon, (3) to make the device extremely simple and reliable so that the pilot can rely upon it under all conditions.

One object of my invention is to accomplish the solution of these fundamental problems with the least possible apparatus and in a way which will permit the pilot to see all of the operating parts and especially the rotating member and, therefore, to know at once when any derangement has occurred which has stopped the rotation of the gyroscopic member.

Another important defect which is overcome by the present invention is that prior gyroscopic horizons, while satisfactory for ordinary flying, could not be used for stunt flying, including loops and barrel rolls. While it is possible to so arrange the clearances of a gimballed gyroscope that loops and barrel rolls may theoretically be accomplished, it is found in practice that with all gimbal ring constructions the apparatus will sooner or later get into a position where the gimbal rings are crossed or twisted so as to cause violent precession of the gyroscope and upset the same, thus rendering it inoperative for the time being. By the present invention all gimbal rings which directly support the gyroscopic element are eliminated and the three degrees of freedom secured by a single external universal bearing, providing freedom about the spinning axis and freedom about both horizontal axes without the use of the usual rotor bearings and gimbal ring bearings. Preferably, also, the indicator on the gyro element is of such a character that it may be seen equally well from either side of the instrument so that although the instrument is only visible from the front, the visible level indicator remains in view even though the airplane may turn completely over as in a loop the loop.

Referring to the drawings.

Figure 1:
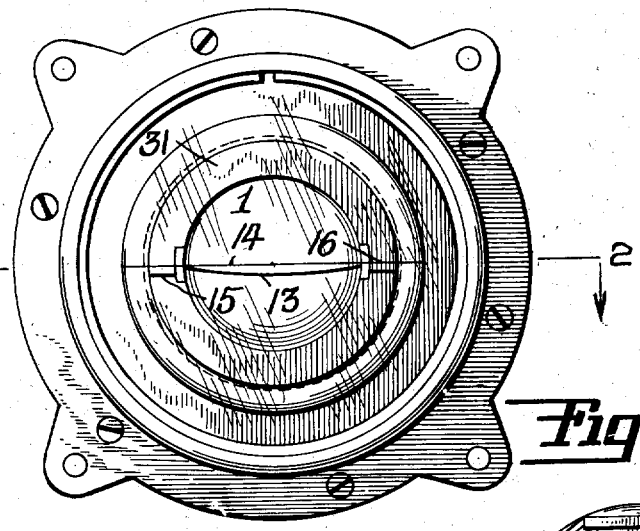
Fig. 1 is a view of the face of my instrument showing the means for indicating to the pilot the attitude of his plane to the horizon.

Referring now to Figs. 1 to 4, the ball or rotor 1 is supported on a film of air in the spherical annular chamber 2, which provides in effect a continuous or upper and lower bearings for the ball (Fig. 4), leaving the front of the equatorial section thereof visible. The annular chamber is supported on a lateral horizontal axis in the ball bearings 3. The ball bearings are carried in a fork 4, and the fork is carried on a longitudinal horizontal trunnion 10' in the anti-friction spaced bearings 5 and 6. The rearward of said bearings may be formed in the back plate 38, while the forward bearing 5 is supported in a bracket 42 rising from a forward extension 39 of the plate 38. The ring or rotor bearing casing supporting the ball is made pendulous as by a mass 2' and, as the ring is suspended freely in ball bearings around both horizontal axes on trunnions 63, it will hang in the true vertical when not subjected to acceleration forces. The whole device as shown in Fig. 1 is mounted in the plane with the axis of the fork fore and aft, i. e., coincident with the longitudinal axis of the plane. To avoid violent swinging of the pendulous gyroscopic member around the longitudinal axis, I attach to the shaft fork light vanes 7 which are enclosed in the chamber 8 secured to plate 38 with very small clearance between the vanes and the walls of the chamber. Therefore, any tendency to swing quickly around the axis of the fork is resisted by the slow escape of the air between the vanes and the walls of the chamber, thus damping any violent movements but at the same time not interfering with the accurate settling of the supporting cup in the true vertical.

Figure 7:
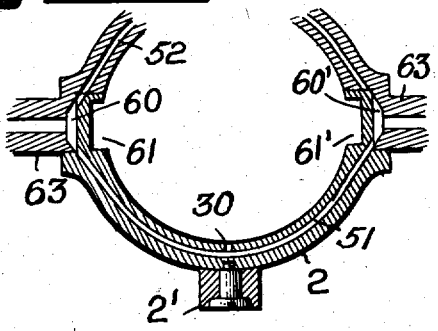
Fig. 7 is a vertical section of the annular chamber 2, showing the air channels therethrough.

For driving the ball, I introduce air through a hole and filter chamber 9 in back plate 38 and thence through the hollow passages 10 and 11 in the fork to transverse and axial bores 60 and 60' in trunnion 63 to tangential air jets 12 in the spherical supporting ring. Annular channels 61 and 61' adjacent the jets permit the ready escape of the spinning air. I also introduce air through orifices 30 shown in Figs. 4 and 7 to the upper and lower surfaces of the supporting ring in such manner as to support the ball on an air film. These orifices communicate with passages 51 and 52 through the chamber 2. I have found from experience, however, that even though supporting air is not supplied, the rotation of the ball will wipe air between the surfaces of the ball and the supporting ring, thus creating a supporting film.

Figure 3:
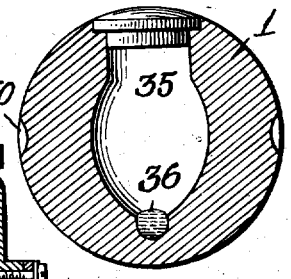
Fig. 3 is a sectional view of the ball or gyroscopic member of the horizon, also showing a modification.
Figure 2:
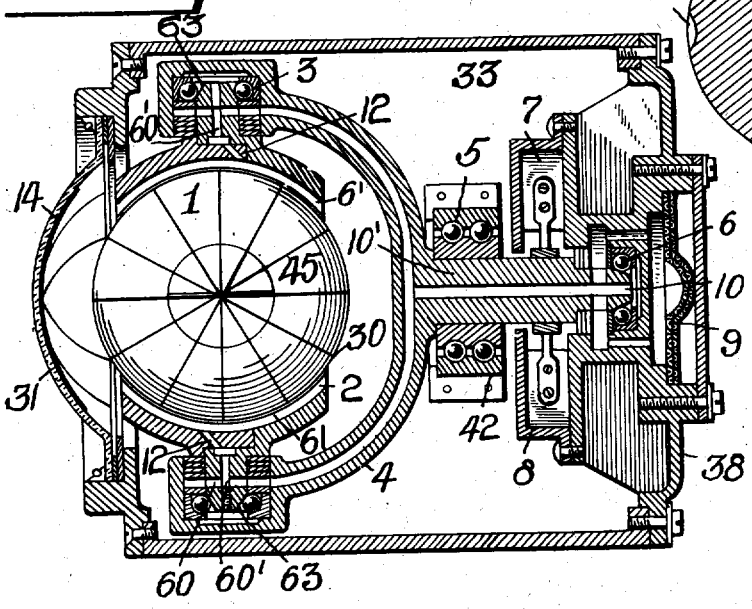
Fig. 2 is a section of the same on line 2—2 of Fig. 1.

The arrangement of air jets shown in Fig. 2 will produce a high velocity of rotation of the ball around an axis at right angles to the plane of the paper. To insure that the ball will always rotate around the same axis, I give it a major axis by making it hollow as shown in Fig. 3, and to insure that it starts rotation on this major axis I either make the ball slightly pendulous or I make the hollow chamber 35 of greater dimensions axially than diametrically and of circular cross section diametrically. The cavity is also preferably tapered at the bottom. As shown in the drawings, the cavity is substantially pear-shaped tapering toward the bottom and of greatest diameter near the middle. I then place in that chamber a globule 36 or small amount of mercury or other heavy liquid, i. e., much less liquid than is necessary to fill said chamber. When not rotating, the globule of mercury will find its way to the small recess in the end of the chamber and will thus make the ball pendulous, causing the ball to settle in that position as rotation ceases and causing it to assume that position (with its spin axis vertical) as it is being spun up. When brought up to speed, the mercury is thrown out by centrifugal force and distributes itself evenly around the equatorial plane of the ball, thus making the ball non-pendulous. The amount of pendulosity can be governed accurately by the shape of the bore.

By employing a small amount of liquid within a symmetrical cavity in the ball, I also achieve another very important purpose by eliminating a serious drawback to the ball type, air supported gyroscope. If such gyroscopes having three degrees of freedom are originally spun up about any other axis than the normal spin axis, i. e., the axis of maximum moment of inertia or major axis, the ball will nutate. While such a phenomenon is observable in an ordinary gyroscope, it is not serious because it is speedily damped out by friction. In the case of the air supported ball gyroscope, however, the problem of eliminating nutation in a reasonable time is serious on account of the extreme freedom of support of the gyroscope. I have found, however, that by placing a small amount of liquid within the hollow bore in the ball, any original nutation is speedily dissipated or damped by converting into energy of spin. To this end, the only requirement is that the only axis about which the fluid can spin with an unbroken symmetrical free surface is the normal axis of spin of the ball, so that if the ball is started with an initial nutation, the inertial reaction of the fluid in its unstable position is such as to transfer the nutation energy into spin energy about the spin axis. Such a phenomenon is not confined to the ball gyro with a vertical spin axis. In any case, the amount of fluid which is critical is that amount which will not provide a symmetrical free surface about any other axis than the desired axis of spinning. It may also be observed that by using a fluid such as mercury, which has a greater density than the density of the steel or brass rotor, the moment of inertia of the ball is increased when spinning.

The equator of the ball, the plane of which lies perpendicular to the major axis of bore 35 and which is engraved with an easily distinguishable line or marking, is made to seek the true horizon by the centralizing action of the driving air jets. To those who are familiar with the art, it will be seen that once the ball is started rotating, any departure of the ball from the axis of its driving jets will result in components from those driving jets which will result in precessing the axis of the ball into the axis of the driving jets by the shortest path and without oscillation. In other words, I have, by the arrangement shown in Fig. 1, an extremely simple, aperiodic gyroscope, gravitationally controlled, which requires no means of damping other than the jets themselves, which jets would be necessary in any case for the purpose of driving the ball.

It will also be seen that by this construction I have succeeded in obtaining a horizon indicator which may be used in stunt flying as well as in ordinary flying, since it will be unaffected by maneuvers in the air no matter how involved. No gimbal rings are employed directly, but the ball gyroscope is floated in an air support which gives it freedom about its vertical spinning axis and about both horizontal axes.

Figure 4:
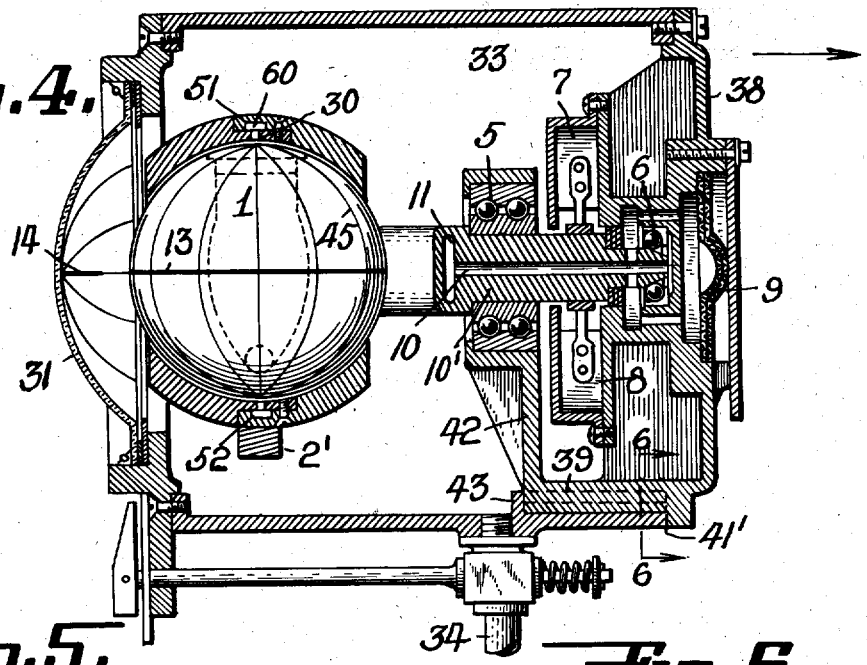
Fig. 4 is a vertical section of the instrument.

As a means of indicating to the pilot the attitude of his plane to the horizon, I mark the equator of the ball in some easily distinguishable manner as by a bright red line, as shown at 13 in Figs. 1 and 4. Meridional lines 45 may also be provided so that the aviator may tell whether the ball is spinning or not. Such lines may also be used to furnish a valuable indication of the rate of rotation of the ball. For instance, if only one meridional line is employed, this line will be seen as a flicker even at fairly high speeds up to the vicinity of 1400 R. P. M. and it is only above such a speed limit that the line becomes a smooth blur. I prefer to choose a number of meridional lines that will give an automatic flicker alarm if any change of speed unusual to proper functioning occurs. I also engrave on the face plate 31 of the instrument which is fixed to the airplane a line 14. I also engrave on the spherical ring horizontal index lines 15 and 16.

Assuming that the line 13 engraved on the equator of the ball is coincident with the true horizon and that the device is placed on the instrument board in front of the aviator, it will be seen that a diving movement of the plane would result in raising the line 14 engraved on the face plate above the line 13 on the ball, and a climbing attitude of the plane would result in depressing the line on the face plate below the line on the equator of the ball. Therefore, in controlling his plane around the lateral axis, the pilot would only need to remember that he must move his controls in such manner as to restore the line 14 engraved on the face plate to the line 13 engraved on the ball. This action will be instinctive and as easy as flying with the view of the natural horizon. The same would hold for tilting of the plane around the longitudinal axis; that is to say, a position where the right wing is down would be indicated by a downward tilt to the right of the line engraved on the face plate with respect to the line on the ball, and the pilot would only need to memember that he must restore the one to the other by moving his controls to the left.

It should also be noted that the visibility of the equatorial line 13 is unaffected by any looping the airplane may do. A complete loop of the gyroscope will have the effect of turning the supporting trunnion 10' through an angle of 180° around the ball so that the ball will be viewed from the opposite side. This, however, will make no difference in the indication given, since the equatorial line will remain in position, the ball, however, revolving in this instance in the opposite direction with respect to the plane but the same direction with respect to the ring 2 and jets 12. The same is true of barrel rolls.

I have found from experiment that, with a perfectly smooth surface on the ball, it has a very long natural period as a pendulum. This period exceeds 4 minutes for a movement of 10 degrees. If desired, however, I could lengthen the period of the ball by the simple expedient of grinding narrow slots 50 around the equator (Fig. 3) or a line of buckets, thus giving the air a greater grip on the ball around the normal axis of rotation than around any other axis and increasing the rate of rotation. It will be seen by those familiar with the art that the rate at which the axis of the ball is restored to the axis of the jets is governed by the relation between the torque of the jets around the axis of rotation to the torque which the jets are able to produce on the ball around other axes, i. e., the period varies directly as a function of the rate of rotation and inversely as a function of the erecting couple. Moreover, the period of the gyroscope may be regulated so as to give the best results without being restricted to using an erecting torque sufficiently strong to overcome gimbal friction, as in the ordinary gimbal supported gyroscope. For this reason I may employ a gyroscope with a much longer period than a gimballed gyroscope because I have reduced friction about horizontal axes to a minimum.

The arrangement shown in Fig. 1 accomplishes an additional desirable objective in that it provides a simple banking indicator, i. e., a means for indicating to the pilot whether or not he has the correct bank which will prevent skidding or slipping. This is accomplished by the simple expedient of engraving lines on the face of the spherical ring as shown at 15 and 16 in Fig. 1. The spherical ring is a pendulous member. Therefore, if the banking is correct, the lines 15 and 16 on the ring should stay in coincidence with the line 14 on the face plate of the instrument. When turning right, a condition producing skidding would be indicated if the right hand line 16 on the spherical ring should be above the line 14 on the face plate. A condition liable to produce slipping would be indicated if the right hand line on the spherical ring were below the line on the face plate. For a left turn, obviously the same would be true on the opposite side of the instrument.

The air for driving the ball and supporting it may be provided either by venturi or pump, connected in such manner as to produce a vacuum within the casing of the instrument or by a positive pressure. The vacuum type of driving the instrument is shown in the section elevation in Fig. 4, the air being withdrawn from the casing 33 through tube 34.

In order that the instrument may be readily taken apart and inspected, I prefer to attach all the bearings and other parts of the gyroscope to the back plate 38 of the casing 33. The back plate is shown as provided at the bottom with a forward extension 39 having a T-shaped head 40 engaging a trackway in the bottom of the casing 33. The base plate 38, therefore, may be slid inwardly with the T head 40 in the trackway until the shoulder 41' thereon bears against the end of the casing 33, and the inner edge of the bracket 42 which supports the inner ball bearing 5 rests against the shoulder 43 on the base.

Figure 5:
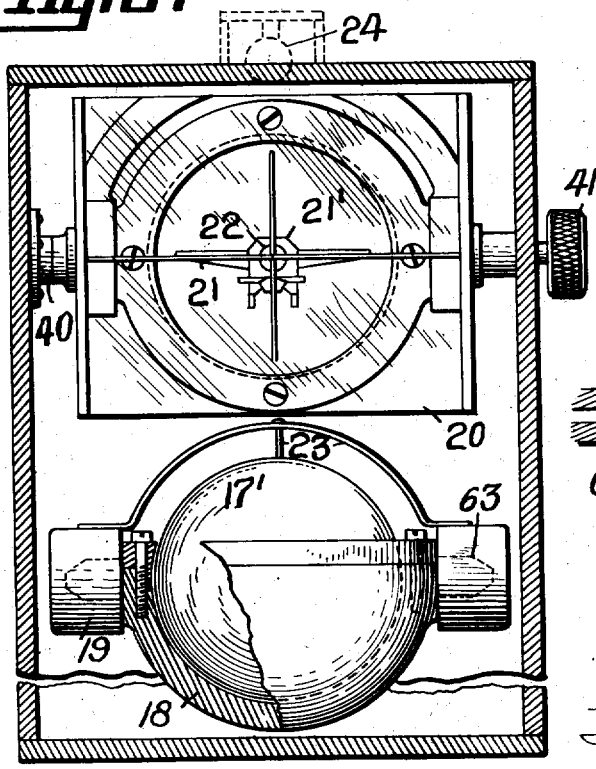
Fig. 5 is an alternative form of the device providing means for indicating the relation of the airplane to the vertical.
Figure 6:
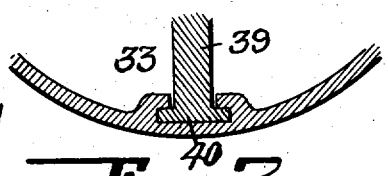
Fig. 6 is a sectional detail taken on line 6—6 of Fig. 4.

The alternative form of the device shown in Fig. 5 involves the use of a ball 17 supported on an air film in a cup 18, the cup in turn supported in gimbal bearings in a fork 19, and the fork in turn supported in gimbal bearings in a manner similar to that shown in Figs. 1 and 2. In the arrangement shown in Fig. 5, the gyroscopic member is covered by the face plate (not shown) of the instrument, and an image of the top of the ball is reflected in a mirror 20 pivoted on axis 40 and adjusted by knob 41. On this mirror are engraved lines 21, 21' which represent the airplane. The axis of the ball is indicated by a bright spot 22. The position of the pendulous cup is indicated by cross wires 23. As the image of the axis of the ball in relation to the airplane and to the cup is shown by reflection in the mirror, the pilot is provided with a direction indication of departures of his plane from the true vertical. The top of the ball may be illuminated by an incandescent light 24. As in the main form, the correct banking angle is also indicated by comparing lines 23 and the airplane instrument 21, 21'.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyro artificial horizon, a ball, a cup for supporting said ball on an air film, and an air jet in said cup for spinning said ball about a vertical axis.

2. In a gyro artificial horizon, a ball, a cup for supporting said ball on an air film, means for pendulously mounting said cup, and an air jet in said cup for spinning said ball and maintaining the spinning axis vertical.

3. In a gyro artificial horizon for aircraft, a ball, a cup for supporting said ball on an air film, an air jet in said cup for spinning said ball about a vertical axis, said ball having an equatorial ring and a cooperating index on a fixed part of the aircraft.

4. In a gyro artificial horizon for aircraft, a ball, a cup for supporting said ball on an air film, means for pendulously mounting said cup, an air jet in said cup for spinning said ball and maintaining the spinning axis vertical, said ball having an equatorial ring, a cooperating index on a fixed part of the aircraft to show pitch and lateral inclination, and a second index on said pendulous cup cooperating with said other indicators to show the correct banking angle.

5. In a gyro artificial horizon having a casing, a ball-like rotor, upper and lower spherical bearings for the same, a pendulous support for said bearings universally mounted in said casing, an equatorial ring on said ball visible from the front of the instrument to show horizontality in both planes, and cooperating indices on said casing against which said ring may be read.

6. A gyro horizon indicator comprising a casing having a transparent front window, a gimbal member supported only at the back of said casing for oscillation about a horizontal axis, a rotor bearing ring pendulously journalled in said member for oscillation about a second horizontal axis normal to said first axis, and a ball-like rotor peripherally supported in said ring for spinning and precessing and having an equatorial marking and a normally horizontal mark at said front window, whereby the attitude of the craft may be observed about both horizontal axes.

7. A gyro horizon indicator comprising a casing having a transparent front window, a gimbal member supported only at the back of said casing for oscillation about a horizontal axis, a rotor bearing ring pendulously journalled in said member for oscillation about a second horizontal axis normally to said first axis, and a ball-like rotor peripherally supported in said ring for spinning and precessing and having an equatorial marking, a normally horizontal mark at said front window, and an index on said ring cooperating with said other two markings, whereby the attitude of the craft may be observed both with respect to the horizon and the correct banking angle.

8. In a gyro artificial horizon, a ball-like rotor, a lower hemispherical bearing for the same, an index on the upper pole of the ball, a mirror above the ball and angularly positioned to project the image of the index forward, and cooperating markings on said support and mirror to show inclination and banking.

9. In a gyro artificial horizon, a ball-like rotor having an axial bore closed at least at the bottom, said bore being of greatest diameter near the middle and tapering toward the bottom, and a small quantity of fluid in said bore for the purpose specified.

10. In a gyro artificial horizon, a ball-like rotor having an axial bore closed at both ends, said bore being of greatest diameter near the middle and tapering toward each end, and a quantity of heavy liquid sealed in said bore for the purpose specified.

11. In a gyro artificial horizon, a ball, a cup for supporting said ball on an air film, means for pendulously mounting said cup, damping means for said pendulous cup, and an air jet in said cup for spinning said ball and maintaining the spinning axis vertical.

12. In a gyro artificial horizon having a casing, a ball-like rotor, upper and lower spherical bearings for the same, a pendulous support for said bearings universally supported in said casing, damping means for said support, an equatorial ring on said ball visible from the front of the instrument to show horizontality in both planes, and cooperating indices on said casing against which said ring may be read.

13. In a gyro artificial horizon for aircraft, a ball-like rotor, upper and lower spherical bearings for the same, a universal pendulous support for said bearings, an equatorial ring on said ball visible from the front of the instrument to show horizontality in both planes, a cooperative index fixed on the craft, and a second index on said pendulous support cooperating with said two other markings to show the correct banking angle.

14. In a gyro artificial horizon for airplanes, a ball rotor, a meridional ring around the same furnishing a universal air film bearing therefor, said ring being open at front and rear, means for pendulously supporting said ring on a normally athwartship axis, and an equatorial ring on said ball visible normally through said front opening but equally visible through the other opening in case the airplane loops or somersaults.

15. In a gyro artificial horizon for airplanes, a ball rotor, a meridional ring around the same furnishing a universal air film bearing therefor, means for pendulously supporting said ring, and means on said ring for spinning said rotor about a vertical axis.

16. In a gyro artificial horizon, a ball, a cup for supporting said ball on an air film, means for pendulously mounting said cup, and an air jet in said cup for spinning and erecting the ball, said spinning force being of much greater magnitude than the erecting force to give a long period.

17. A ball type gyroscope having an axial bore of circular cross section closed at the ends, and a small quantity of liquid sealed therein, whereby nutation is suppressed.

18. A ball type gyroscope having a cavity therein having its greatest dimension along the desired spin axis of the ball and of circular cross section, and a heavy liquid therein of an amount insufficient to provide a symmetrical free surface about any other than said spin axis.

19. In a gyro artificial horizon, a ball-like rotor having an axial bore closed at both ends, said bore having a circular cross section and tapering to the bottom, and a quantity of heavy liquid sealed in said bore for the purpose specified.

20. In a gyro artificial horizon, a ball having an axial bore of circular cross section, and a small quantity of liquid sealed therein, a cup for supporting said ball on an air film, and an air jet for spinning said ball about a vertical axis.

21. In a gyro artificial horizon having a casing, a ball-like rotor, upper and lower spherical bearings for the same, said ball having nutation damping means within the same, a pendulous support for said bearings universally mounted in said casing, an equatorial ring on said ball visible from the front of the instrument to show horizontality in both planes, and cooperating indices on said casing against which said ring may be read.

22. In a gyro artificial horizon for aircraft, a ball, a cup for supporting said ball on an air film, an air jet in said cup for spinning said ball about a vertical axis, said ball having an equatorial ring and a bore of circular cross section having its major axis perpendicular to the plane of said ring, and a cooperating index on a fixed part of the aircraft.

23. In a gyro artificial horizon for aircraft, a ball, a cup for supporting said ball for spinning about a vertical axis on an air film, means on said cup for spinning said ball about said axis, C-shaped gimbal means for universally supporting said cup having its major axis extending fore and aft and its minor axis normally athwartship, said major axis being provided by a single long bearing stud centrally attached to the gimbal at the rear thereof, said ball having an equatorial ring and a cooperating index on a fixed portion of the craft whereby no part of the gimbal means extends between said ring and said cooperating index.

REGINALD E. GILLMOR.